United States Patent
Foley et al.

(10) Patent No.: US 6,953,288 B2
(45) Date of Patent: Oct. 11, 2005

(54) SMA COMPATIBLE, SAFE LASER CONNECTOR SYSTEM

(75) Inventors: Brian Foley, Wilbraham, MA (US); Wolfgang Neuberger, Labuan (MY); Heinrich Kudla, Bonn (DE); Stefan Spaniol, Bonn (DE)

(73) Assignee: CeramOptec Industries, Inc., East Longmeadow, MA (US)

( * ) Notice: Subject to any disclaimer, the term of this patent is extended or adjusted under 35 U.S.C. 154(b) by 0 days.

(21) Appl. No.: 10/423,145

(22) Filed: Apr. 25, 2003

(65) Prior Publication Data

US 2004/0213524 A1 Oct. 28, 2004

(51) Int. Cl.[7] ............................................... G02B 6/36
(52) U.S. Cl. ............................ 385/92; 385/88; 385/60; 385/79
(58) Field of Search ....................... 385/88–94, 55–62, 385/66–74, 76–79, 81, 84, 86–87, 139

(56) References Cited

U.S. PATENT DOCUMENTS

| | | | | |
|---|---|---|---|---|
| 3,764,959 A | * | 10/1973 | Toma et al. | 439/584 |
| 4,482,201 A | * | 11/1984 | Dousset | 385/80 |
| 4,944,568 A | | 7/1990 | Danbach et al. | |
| 5,085,492 A | * | 2/1992 | Kelsoe et al. | 385/60 |
| 5,179,607 A | * | 1/1993 | Sellers et al. | 385/70 |
| 5,699,466 A | | 12/1997 | Uchida et al. | |
| 5,742,718 A | * | 4/1998 | Harman et al. | 385/53 |
| 6,062,739 A | * | 5/2000 | Blake et al. | 385/76 |
| 6,357,932 B1 | * | 3/2002 | Auld | 385/76 |
| 6,517,256 B2 | | 2/2003 | Okamoto | |
| 6,782,167 B2 | * | 8/2004 | Wood et al. | 385/47 |
| 2003/0000739 A1 | * | 1/2003 | Perry et al. | 385/60 |

* cited by examiner

Primary Examiner—Frank G. Font
Assistant Examiner—Ryan Lepisto
(74) Attorney, Agent, or Firm—Bolesh J Skutnik; BJ Associates

(57) ABSTRACT

A safe connection system for coupling radiation from radiation sources, such as lasers, into optical fibers is provided. The system prevents the accidental use of standard optical fibers with radiation sources that require fibers capable of transmitting high power or other radiation with unique characteristics. Because often the fibers for use with high power lasers, for example, may also be used with standard lasers, the system preserves the interchangeability of standard connection systems such as SMA by providing connectors that can properly fit both in standard receptacles and in the receptacles of the present invention. Thus, this connection system preserves the advantages of a standard laser-fiber connection system while increasing the safety of such systems, where it is necessary.

15 Claims, 3 Drawing Sheets

301

302

303

401

402

403

SMA COMPATIBLE, SAFE LASER CONNECTOR SYSTEM

BACKGROUND OF THE INVENTION

1. Field of the Invention

The present invention relates to the field of fiber optic connectors and receptacle connection systems for efficient coupling of radiation from radiation sources to optical fibers. In particular, the present invention relates to coupling systems that restrict the use of certain fibers with certain unique laser systems while remaining universally compatible with standard connection systems such as SMA (subminiature assembly) connectors.

2. Information Disclosure Statement

The ability to safely and efficiently couple optical radiation from sources such as lasers to optical fibers is of great importance in fields that utilize optical fibers to deliver optical radiation. Inefficient coupling can reduce the power of the delivered radiation and thus reduce the quality of the system. For instance, in medical contexts, there are often specific requirements for the delivered power needed, and thus reduced efficiency of coupling radiation into optical fibers can reduce the effectiveness of treatments and again increase costs. Also, the use of improper fibers with certain lasers can pose a significant risk of damaging equipment and injuring practitioners or patients, for example if the emitted power density is too high. Additionally, loss of power at the connection system could run the risk of vaporizing metals or other components in the connection system. In another example, in communications, inefficient coupling increases attenuation and thus reduces the quality of the system or increases its cost by the need to use higher power sources or additional amplification devices.

Numerous systems exist for coupling radiation from a source to an optical fiber. In order to maximize coupling efficiency, the alignment of the fiber end face must be precisely controlled in relation to the radiation source. In addition, the distance of the end face from the source must often also be precisely controlled. There are many examples of such systems in the prior art.

U.S. Pat. No. 5,699,466 describes an optical fiber connector featuring a cylindrical ceramic ferrule through which an optical fiber is concentrically inserted and terminates at the end face of the ferrule. The ferrule extends from the connector a predetermined length, so the end face of the ferrule and fiber are at a given length from a lens unit upon connection with a laser source.

U.S. Pat. No. 6,517,256 describes an optical fiber connector having a ferrule containing an optical fiber, which is affixed by adhesive to a ferrule supporting member. A groove is formed around the ferrule to enhance the strength of the adhesive and more securely affix the ferrule to the ferrule supporting member.

U.S. Pat. No. 4,944,568 discloses a connection system with multiple connections, primarily for communications. The system consists of an assembly for interconnecting a plurality of optical devices to a plurality of fibers, where each fiber terminates in a ferrule having a nose portion. Separate connection modules house a given number of optical fibers and ferrules, and a plurality of connection modules connect with a housing means having a plurality of ferrule receiving cavities. Each ferrule is supported in its cavity by a forwardly projecting nose portion. The nose portion has a reduced diameter end segment extending from a radial step, which is urged into contact with the mating face of the receptacle by a spring. The receptacle assembly consists of a plurality of openings with a diameter sufficient to accept the reduced diameter segment of each ferrule nose portion. All of the above connection systems or connectors utilize a ferrule to secure an optical fiber in a fixed position, along with a means for positioning and immobilizing the ferrule. These systems require the use of a complementary receptacle portion to create a proper connection, and thus each source must be fitted with a unique receptacle.

Standard laser connection systems such as SMA connectors are widely used with medical lasers. Additional fiber optic connector designs include those systems given the common designations ST, SC, FC, D4, and biconic connectors. SMA connectors come in two types. The SMA 905 connector features a straight-diameter ferrule for insertion into the corresponding receptacle. The SMA 906 connector has a dual-diameter ferrule, including a smaller diameter "step-down" portion machined into the ferrule towards the end face of the ferrule, and a large diameter portion. A small plastic full sleeve may be placed over the shoulder of the ferrule for insertion into the connector port for alignment.

FIGS. 1a and 1b illustrate typical SMA connectors. The measurements described are for this example only, and are not meant to apply to all SMA connectors, although all SMA connectors share the same basic components. As seen in FIG. 1a, connector 101 consists of cable 103, boot 105, coupling nut 107 and ferrule 109. Ferrule 109 is made from stainless steel or zirconia, and in this example has a diameter of 0.128 inches. As shown in FIG. 1, ferrule 109 consists of a single diameter. An optical fiber extends through cable 103 and boot 105 and terminates at the face of ferrule 109.

FIG. 1b illustrates a typical SMA 906 connector. Connector 111 consists of cable 113, boot 115, coupling nut 117, and stainless steel ferrule 119. Ferrule 119 consists of a larger diameter portion 121 and smaller diameter portion 123. In this example, large diameter portion 121, which extends from coupling nut 117 to rim 125, has a diameter of 0.120 inches. Smaller portion 123, which extends from rim 125 to the end face of ferrule 119, has a diameter, in this example, of 0.085 inches. As above, an optical fiber extends through connector 111 and terminates at the end face of ferrule 119.

Standard connection systems such as the SMA system described above offer numerous advantages, including both a reduction in cost and an increase in efficiency by avoiding the need to fit specific complimentary lasers and fibers with unique connection systems. Often, a variety of types of optical fibers may be compatible with a single radiation source for a variety of operations or medical treatments. Because they are easily interchangeable, there is no need to create different connectors for each type of fiber or laser. However, some laser systems with specific beam characteristics (hereinafter referred to as "restricted" laser systems or radiation sources) require special fiber delivery systems. For example, some high power or high frequency lasers are incompatible with standard fibers used for lower power applications. Accidentally attaching SMA connectorized fibers conceived for other laser systems may present safety risks when used with these restricted laser systems. Such risks include damage to the fiber and/or the connection system, high losses of power at the connection interface, and possible risk of injury to practitioners and patients. Additionally, mismatching fibers and lasers could also compromise treatment effectiveness. On the other hand, systems conceived for these restricted lasers may well have a wider use with other lasers equipped with standard SMA ports, and would thus benefit from a standardized connection system.

For example, some laser systems, such as diode lasers, exhibit higher beam divergence, or beams with higher numerical apertures (NA), than standard solid state lasers. Also, highly multimode radiation sources also tend to have higher NA. As a result, it is necessary to couple these high divergence laser systems with fiber optic delivery systems that contain light guides with NA that are high enough to sufficiently couple radiation from the source to the light guide. In contrast, solid state laser systems, which produce lower divergence (lower NA) beams than diode lasers and for which many delivery systems have been developed, can be effectively coupled to optical fibers with lower NA. This is desirable because low NA fibers are less expensive and easier to manufacture.

The problem now arises that high NA optical fibers manufactured specifically for diode lasers with higher NA output, and their respective fiber optic laser delivery systems, can in principle be successfully used for traditional solid state laser systems that are frequently already installed in hospitals. However, the traditional low NA fiber systems used for these traditional lasers can be destroyed or even cause harm if they are utilized with the higher NA lasers, such as diode lasers. Thus, it is highly desirable to maximize compatibility and minimize the risk of damage and or accidents by using high NA lasers equipped with a system to accept only certain fibers, while retaining the ability to use those fibers on the traditional systems as well.

Systems do exist for restricting certain lasers with certain fibers, although these are generally of high complexity. For example, U.S. Pat. No. 5,085,492 describes a connection system comprising a connector associated with an optical fiber and a receptacle associated with a laser source. The system can be configured as a standard SMA connection system. Electrical contacts are fitted to the connector and receptacle. A unique electrical signal emits from different kinds of fibers, which is relayed to sensing circuitry. This system detects whether a fiber is connected and detects the particular characteristics of the fiber. This system is complex due to the need for electronic circuitry and due to the need to input the characteristics of each fiber into the system and associate each type of fiber with a specific electric signal.

Thus, there exists a need for a connection system that incorporates the advantages of a standardized connection system while increasing safety by ensuring that incompatible fiber-laser pairs cannot be connected. The present invention addresses this need in a direct mechanical way.

OBJECTIVES AND BRIEF SUMMARY OF THE INVENTION

Briefly stated, the present invention provides a safe connection system for coupling radiation from radiation sources, such as lasers, into optical fibers. The system prevents the accidental use of standard optical fibers with radiation sources that require fibers capable of transmitting high power or other radiation with unique characteristics. Because often the fibers for use with high power lasers, for example, may also be used with standard lasers, the system preserves the interchangeability of standard connection systems such as SMA by providing connectors that can properly fit both in standard receptacles and in the receptacles of the present invention. Thus, the present invention preserves the advantages of a standard laser-fiber connection system while increasing the safety of such systems, where it is necessary.

The above, and other objects, features and advantages of the present invention will become apparent from the following description read in conjunction with the accompanying drawings, (in which like reference numbers in different drawings designate the same elements.)

DETAILED DESCRIPTION OF THE PREFERRED EMBODIMENTS

Figure 1A:
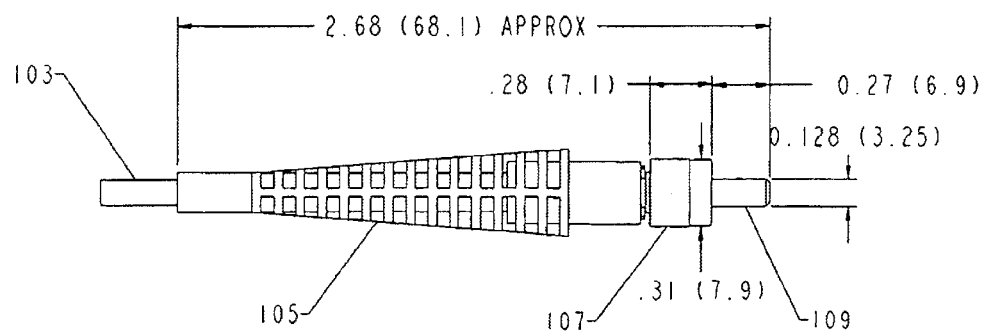
FIG. 1a—Illustration of a standard SMA 905 connector.
Figure 1B:
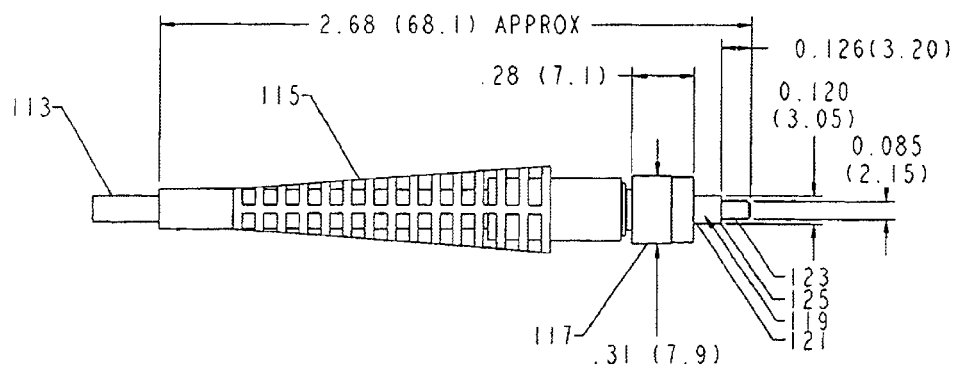
FIG. 1b—Illustration of a standard SMA 906 connector.

The present invention incorporates the advantages of a standard connection system, while simultaneously increasing the safety of these systems by providing a connection system that allows certain lasers with specific radiation characteristics (hereinafter referred to as "restricted" lasers or radiation sources) to restrict connection to suitable fibers while allowing such fibers, which may be suitable for use with various laser systems, to be easily connected to other lasers.

A special connector and receptacle are designed in such a manner that fibers equipped with the connector will fit into standard SMA receptacles of other laser systems, but standard SMA connectors do not fit into the receptacle component of the present invention. Essentially, the connector features a ferrule characterized by a rim with a smaller diameter between the rim and the face of the ferrule. Likewise, the receptacle features discriminating means to prevent insertion of a standard SMA connector, such as a dual-diameter cylindrical opening corresponding to the ferrule. This system thus protects those fibers with standard SMA connectors from being accidentally connected to restricted lasers, such as high power lasers, but allows the fibers with the connectors of the present invention to be connected with other lasers with standard SMA ports. This is important in that these restricted fibers may well have a wider use with other lasers equipped with standard SMA ports.

For the purposes of this disclosure, "proximal" refers to the portion of the receptacle opening closest to the laser source and to the smallest dimension of the connector ferrule. "Distal", refers to the portion of the receptacle opening farthest from the laser source and the largest dimension of the connector ferrule. "Standard SMA" refers to SMA 905 and 906 series connectors. The ferrule diameters of a "standard SMA" connection system may vary, and thus the term is not restrictive to specific dimensions. It is to be understood that any of the described embodiments should be altered to reflect the dimensions of the particular SMA varieties involved.

In a preferred embodiment of the present invention, the ferrule is reduced in diameter along some portion between the end face of the ferrule and a point along the length of the ferrule. Thus, the ferrule consists of a small diameter proximal portion and a larger diameter distal portion. These diameters are both significant, in that they allow the fiber to be accurately seated in both standard receptacles and receptacles of the present invention. First, because the diameter of the proximal portion is smaller than the diameter of the opening of an SMA receptacle, the connector can fit into any receptacle. Second, because the diameter of the distal portion is equal to the standard diameter of an SMA connector ferrule, this portion ensures proper alignment with any standard SMA connector as well as with receptacles of the present invention.

The receptacle of the present invention features a discriminating portion of a size sufficient to allow the receptacle to accept a connector of the present invention but sufficiently small so as to prevent insertion of a standard SMA connector ferrule. In a preferred embodiment, the receptacle has a cylindrical opening with two distinct diameters. The diameter of the distal portion of the opening is equal to the large diameter of any standard SMA receptacle opening. The diameter of the proximal portion of the opening is within a given tolerance range of the diameter of the proximal ferrule portion, and is thus smaller than any diameter of a standard SMA ferrule. The proximal portion of the opening forms the discriminating portion of the receptacle. If the connection system is designed to be used with standard SMA 905 connectors, the discriminating portion must have a smaller diameter than the SMA 905 ferrule diameter. If the connection system is designed to be used with standard SMA 906 connectors, the discrimination portion must have a smaller diameter than the small diameter portion of the SMA 906 ferrule. Thus, a standard SMA connector will not physically fit into the opening, and connection will be impossible. Connectors of the present invention, however, are designed to readily fit into this receptacle.

In another embodiment, the proximal ferrule portion and the discriminating portion of the corresponding receptacle's opening need not be circular. Other cross-sectional shapes such as an ellipse, an oval, a polygon including a rectangle and a hexagon, or any other non-circular shape may also be useful. For example, if a square shaped proximal portion is utilized, it will be effective as long as the length of the diagonal is smaller than a diameter of a standard SMA ferrule. Non-circular shapes may also be useful in further restricting connectors beyond simply SMA connectors, by allowing the creation of receptacles that can discriminate against not only standard SMA connectors, but also other restricted lasers fitted with specific variations of the connection system of the present invention. A situation where this embodiment would be useful is described in Example 2.

In a further embodiment, the discriminating portion of the receptacle opening is non-cylindrical. For example, the discriminating portion may be tapered along the length of the opening, so that the diameter of the discriminating portion is equal to, within given tolerances, the diameter of the proximal portion of the connector ferrule at a given point along the opening. The discriminating portion increases in diameter, for example, as the portion progresses towards the proximal end of the opening. This embodiment serves to prevent insertion of standard SMA connectors and other unallowable connectors while also preserving the distal portion of the opening as the sole means for aligning the ferrule.

If a user attempts to connect a standard SMA connectorized fiber into a restricted laser fitted with a receptacle of the present invention, it will not fit and a connection will not be made. This system thus provides a simple and quick signal to a user that they have the wrong fiber, as well as providing the safety of precluding the risk that a standard fiber is accidentally connected to a high power or other non-standard laser. Because high power lasers can generate large amounts of heat, it is important to not generate that heat in the connection process to avoid damaging the laser, fiber or connection system. It has been found that, by creating only a small diameter reduction at a proximal portion of the connector ferrule and restricting the reduced diameter proximal portion to a small length, heat removal requirements for high power lasers were met. At the same time, these small changes relative to standard connectors were sufficient to enable the new connection receptacle not to accept standard SMA connectors. The present invention is simpler than the microswitches that are typically used for safety reasons, and can effectively replace such microswitches with a system that provides instantaneous feedback, prevents improper connections, and does not have any circuitry or switches that could malfunction or break.

In another preferred embodiment, the receptacle contains a cylindrical opening with a diameter equal to the diameter of the opening of a standard SMA receptacle, and the opening contains means to prevent insertion of standard SMA connectors while allowing insertion and proper alignment of the connector of the present invention. The preventive means may be a cylindrical rim or border with an inside diameter corresponding to the diameter of the proximal portion of the connector of the present invention. This run may be formed by a small proximal opening portion as described above, or may be a ring inserted at a point along the length of the receptacle opening corresponding to the length of the distal portion of the ferrule. A useful length of the distal portion of the ferrule is in the range of 2.5 mm to approximately 5 mm. Alternatively, the restrictive means may be one or more plugs extending from the side of the opening toward the center of the opening. The length of the protruding portion of the plug would be equal to, within a given tolerance, the difference between the diameter of the proximal portion and the distal portion of the ferrule. This embodiment, as with the dual-diameter cylindrical opening embodiment above, serves to prevent the larger diameter standard SMA connector from being inserted into the receptacle.

Radiation sources that would particularly benefit from the present invention include, but are not limited to, high power lasers. Some lasers, for example, require higher diameter fibers, so that if a standard fiber of insufficient sized is used, there is a greater loss of power at the connection, as well as the potential for delivering a higher power density than desired, resulting in a safety risk.

Figure 2:
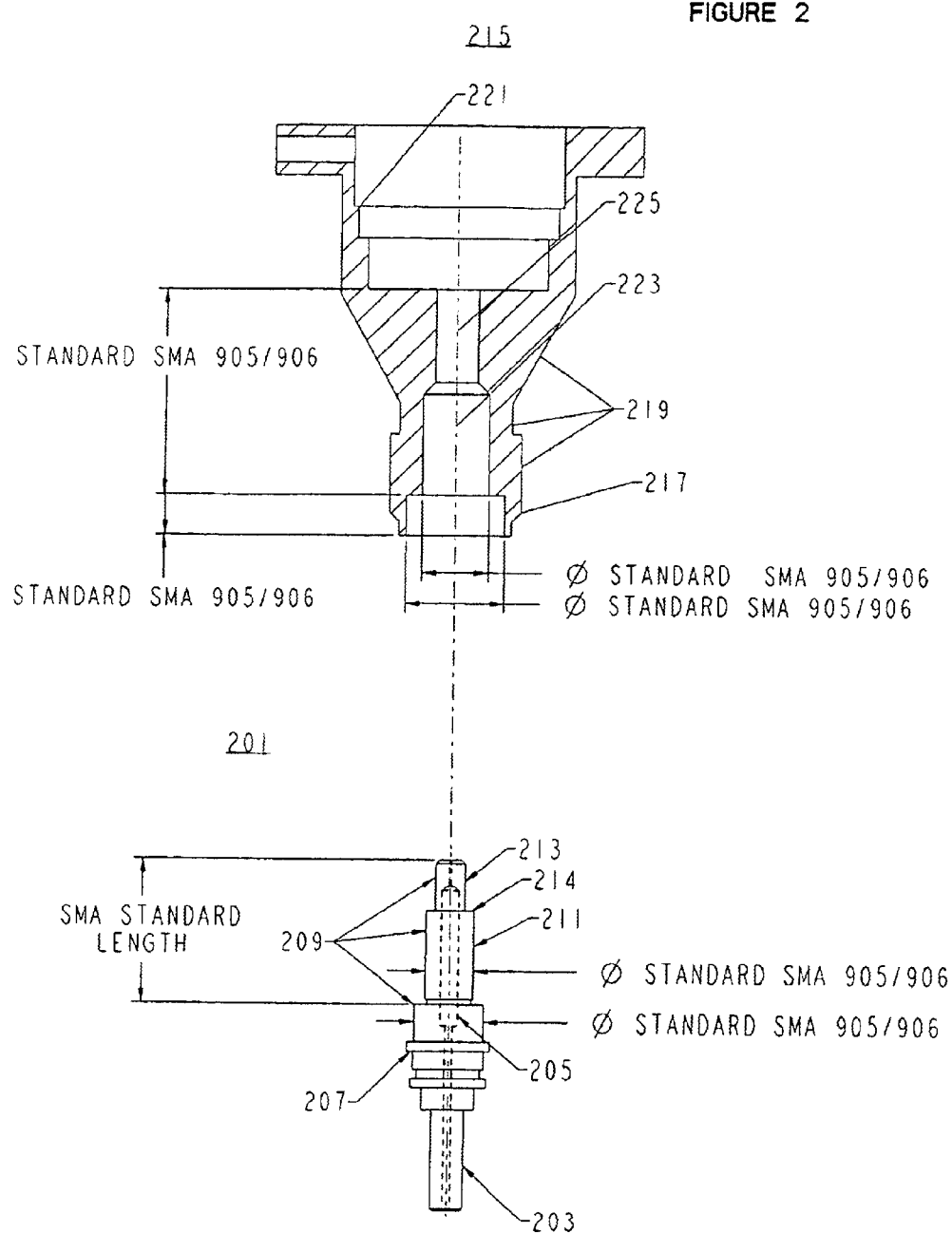
FIG. 2—Illustration of a preferred embodiment of a connector and receptacle.

A preferred embodiment of the present invention is illustrated in FIG. 2. Connector 201 consists of cable 203 housing optical fiber 205, which is connected to ferrule section 207, over which a threaded nut can be fitted for securing connector 201 to receptacle 215. Fiber 205 extends through ferrule 209, which contains a drilled bore matched to the diameter of fiber 205. Ferrule 209 is of a total length equal to that of the ferrule of a standard SMA connector. Distal ferrule portion 211 has a diameter equal to the diameter of a standard SMA 905 connector ferrule or equal to the large diameter of a standard SMA 906 connector ferrule. Distal ferrule portion 211 will allow connector 201 to properly fit with a standard SMA receptacle, and will also serve to properly align with a laser fitted with a standard SMA receptacle. Proximal ferrule portion 213 has a smaller diameter than distal ferrule portion 211, and forms circumferential rim 214 with a face perpendicular to the axis of ferrule 209. The diameter of proximal ferrule portion 213 is smaller than the diameter of proximal receptacle opening 225 by preferably 0.04 mm–0.10 mm, and also has a smaller diameter than the diameter of a standard SMA 905 connector ferrule or the small diameter of a standard SMA 906 connector ferrule.

Receptacle 215, which is connected to a laser source, consists of outside threaded portion 217, receptacle opening 219, and lens 221. Other embodiments of the present invention are not restricted to the use of threaded coupling systems as seen in most standard SMA connectors. The connectors of the present invention may utilize other coupling means. The length of opening 219 is equal to that of a standard SMA receptacle opening. Distal opening portion 223 is cylindrical and has a diameter equal to that of a standard SMA 905 receptacle opening or equal to the large diameter of a standard SMA 906 receptacle opening. Proximal opening portion 225 (forming the discriminating portion) has a diameter that is smaller than the diameter of a standard 905 connector ferrule or the small diameter of a standard SMA 906 connector ferrule, and has a diameter preferably between 0.04 and 0.10 mm larger than the diameter of proximal ferrule portion 213.

Because the diameter of proximal opening portion 225 is smaller than any diameter of the ferrule of both SMA 905 and 906, receptacle 215 will not allow a connection with a standard SMA connector of either type. On the other hand, because proximal ferrule portion 213 is smaller than any diameter of both SMA 905 and 906 connectors, connector 201 can be used with any SMA receptacle. In that case, distal ferrule portion 211 provides the means for proper alignment with a laser source featuring a standard SMA receptacle or a receptacle of the present invention.

In a preferred embodiment, the present invention also provides for further differentiation and safety by providing numerous versions of ferrule 209 that are specific for different size fibers. For example, in many cases it is desirable to restrict the size of an optical fiber that is allowable for use with a given laser source to within a certain limit. Especially in medical applications, if a connected fiber is too small, the emitted power density will be too large and could injure the patient. In this embodiment, all ferrules 209 have distal portion 211 that is compatible with standard SMA receptacles. However, the diameter of proximal opening portion 225 is dependent on the minimum size of the fiber that may be safely used. The diameter of proximal opening portion 225 has an inverse relationship with the minimum size of the fiber that can properly be used with a given ferrule. Thus, connectors for larger fibers have smaller proximal opening portions and proximal ferrule portions, and connectors for smaller fibers have larger proximal opening portions and larger proximal ferrule portions. In this way, connectors for smaller fibers will not be able to fit in receptacles meant for larger fiber connections, but larger fibers will be able to fit in any receptacle. In this way, it is assured that fibers of insufficient size will not be connected to inappropriate radiation sources. It may alternatively be the case that larger diameter fibers may be dangerous. In that case, an embodiment similar to that described above is provided, but where the diameter of the proximal opening portion is directly related to the maximum size fiber that may properly be used with a given laser. In other embodiments, the size of the proximal opening portion is dependent on other factors, such as fiber material, or whether a specific fiber has been approved for use with a given laser to ensure that unapproved fibers are not inadvertently used with a given laser.

Because only a portion of the ferrule is reduced in diameter, standard SMA ports will still accept the new connector and the larger diameter portion will still act to maintain the proper alignment. Thus, fibers attached to the connectors of the present invention will be compatible to both restricted lasers with receptacles of the present invention and also to lasers with the standard SMA ports. Conversely, fibers attached to standard SMA connectors will be able to connect to standard lasers, but will be prevented from connecting with restricted lasers featuring the receptacle of the present invention.

The present invention is further illustrated by the following example(s), but is not limited thereby.

EXAMPLE 1

The following measurements are a specific example of a connection system according to the present invention. The following measurements apply to components of the connector and receptacle illustrated in FIG. 2:

| | diameter (mm) | tolerance (mm) | length (mm) |
|---|---|---|---|
| ferrule, distal portion (211) | 3.175 | −0, −0.02 | |
| ferrule, proximal portion (213) | 2.000 | −0.02, −0.05 | 5.0 |
| opening, distal portion (223) | 3.175 | +0, +0.02 | |
| opening, proximal portion (225) | 2.000 | +0.02, +0.05 | approx. 5.0 |
| ferrule, total length | | | 9.8 |

EXAMPLE 2

Figure 3:
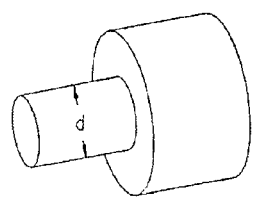
FIG. 3—Illustration of the connectors of an embodiment described in Example 2.
Figure 3:
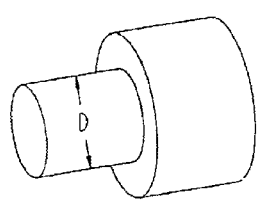
Figure 3:
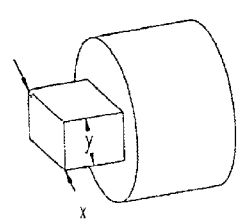
Figure 4:
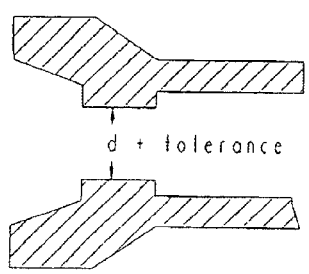
FIG. 4—Illustration of the receptacles of an embodiment described in Example 2.
Figure 4:
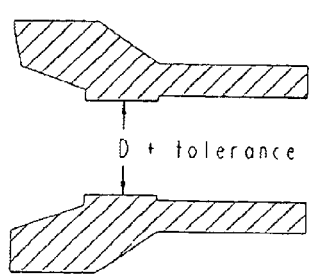
Figure 4:
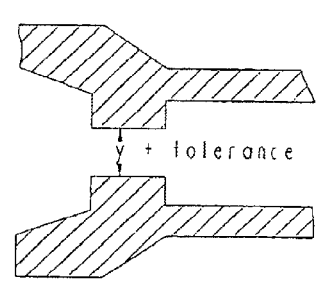

Different connector/receptacle systems according to the present invention can be constructed to restrict certain connectors in addition to standard SMA connectors. For example, three lasers are described that require systems to prevent connection with standard SMA connectors. Lasers 1, 2, and 3 should be equipped with three separate delivery systems because the delivery systems for use in each laser are not fully compatible with all of these lasers. Lasers 1, 2 and 3 are equipped with receptacles 401, 402, and 403, respectively. Laser 1 should be able to accept connector ferrule 301 only, laser 2 should be able to accept ferrules 301 and 302, but not 303, and laser 3 should be able to accept only ferrule 303. The connector ferrules that satisfy these requirements are shown in FIG. 3, and their corresponding receptacles are shown in FIG. 4. Referring to FIG. 3, ferrule 301 has a proximal reduced portion with diameter d, ferrule 302 has a proximal portion with diameter D, and ferrule 303 has a square shaped proximal portion with an end face height of length y and an end face diagonal of length x. Referring to FIG. 4, receptacle 401, connected to laser 1, has a proximal opening portion with diameter d (+tolerance). Receptacle 402, connected to laser 2, has a proximal opening portion with diameter D (+tolerance). Receptacle 403, connected to laser 3, has a square shaped proximal opening with height y and diagonal x (+tolerances). Diameter D is larger than diameter d, thus allowing connector ferrule 301 to fit into both receptacles 401 and 402. On the other hand, connector ferrule 302 will only fit into receptacle 402 and will not fit into receptacle 401. Diagonal length x of the connector ferrule 303 proximal portion is larger than both diameter D and diameter d. This ensures that ferrule 303 will not fit into either receptacle 401 or 402. Height y of connector ferrule 303 proximal portion is smaller than diameter d of ferrule 302, in order to prevent both connector ferrules 301 and 302 from fitting into receptacle 403. Thus, with these proximal portion designs, the desired restriction can be accomplished. In addition, because diameter d, diameter D, and length x are all smaller than a standard SMA receptacle diameter, all of the above connectors will properly fit into standard SMA receptacles while all of the above receptacles will prevent connection with standard SMA connectors.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A laser safety connection system, resembling an SMA-style connection system, comprising a connector and a special receptacle for coupling radiation from a radiation source to an optical fiber, wherein:

both said connector and said receptacle contain a proximal and a distal end, wherein proximal refers to a location that is closest to said radiation source when said connector is inserted into said receptacle, and wherein distal refers to a location that is farthest from said radiation source when said connector is inserted into said receptacle;

said connector is attached to said optical fiber and comprises means to connect to said receptacle and a ferrule containing said optical fiber, and wherein said ferrule is shaped so that said ferrule can fit into and properly align with both said receptacle and standard SMA receptacles; and said receptacle is attached to a radiation source and comprises means to connect to said connector and means to prevent insertion of standard SMA connectors, wherein said preventive means allows said connector to fit into and properly align with said receptacle, but prevents standard SMA connectors from fitting into said receptacle.

2. The laser safety connection system according to claim 1, wherein said ferrule is a cylinder comprising:

a distal ferrule portion having a diameter equal to a diameter of a standard SMA connector; and a proximal ferrule portion, of a predetermined length, having a cross-sectional shape with a largest dimension being smaller than said diameter of said distal ferrule portion, wherein said cross-section is in a plane perpendicular to an axis of said cylinder;

wherein a rim is formed at said predetermined point along said ferrule.

3. The laser safety connection system according to claim 2, wherein said cross-sectional shape of said proximal ferrule portion is circular and said largest dimension is a diameter of said shape.

4. The laser safety connection system according to claim 2, wherein said cross-sectional shape of said proximal ferrule portion is non-circular.

5. The laser safety connection system according to claim 4, wherein said cross-sectional shape is selected from the group consisting of an ellipse, an oval and a polygon.

6. The laser safety connection system according to claim 2, wherein said receptacle comprises an opening shaped to allow said connector to fit into said receptacle and properly align said ferrule and said optical fiber with said radiation source.

7. The laser safety connection system according to claim 6, wherein said opening is a cylindrical opening equal to a diameter of an opening of a standard SMA receptacle.

8. The laser safety connection system according to claim 7, wherein said preventive means restricts said opening to a size that can fit a diameter less than or equal to said diameter of said proximal ferrule portion.

9. The laser safety connection system according to claim 8, wherein said preventive means is a reduced diameter proximal portion of said opening.

10. The laser safety connection system according to claim 8, wherein said preventive means is selected from the group consisting of a ring or at least one plug extending radially from a side of said opening towards a center of said opening.

11. The laser safety connection system according to claim 2, wherein said diameter of a standard SMA connector is selected from the group consisting of:

a diameter of a ferrule of an SMA 905 connector; and a larger diameter of a ferrule of an SMA 906 connector.

12. A medical laser delivery system comprising a connector described in claim 2 and at least one optical fiber terminating in said connector.

13. The laser safety connection system according to claim 1, wherein said preventive means is selected from the group consisting of a ring and at least one plug protruding from an inner surface of said receptacle.

14. An SMA compatible connector of a length equal to a length of a standard SMA connector, comprising a ferrule capable of properly fitting into both a standard SMA receptacle and a receptacle described in claim 1.

15. The set according to claim 2, wherein the shape of said rim is selected from the group consisting of circular, elliptical, oval and polygonal, wherein said polygonal shapes include rectangular shapes.

* * * * *